May 20, 1930. J. BERGER 1,759,729
DEVICE FOR REMOVING EGGS FROM FISH HATCHERIES
Filed April 16, 1928
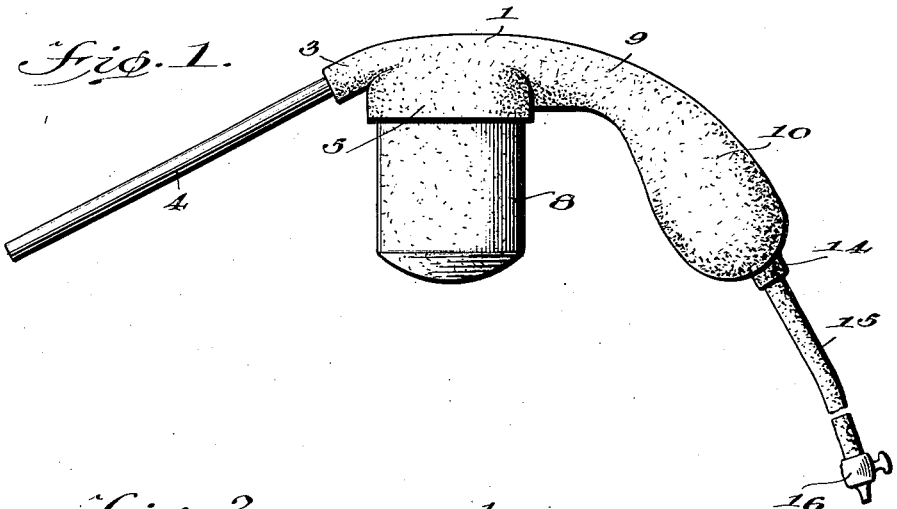
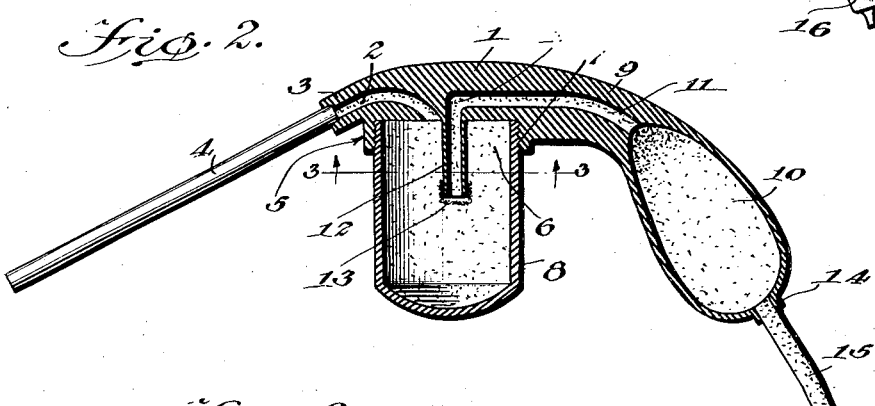
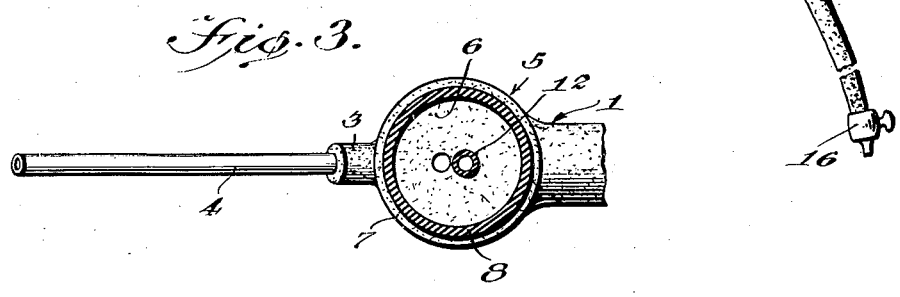
INVENTOR
Joseph Berger,
BY
ATTORNEY Patented May 20, 1930

1,759,729

UNITED STATES PATENT OFFICE

JOSEPH BERGER, OF LAKE VIEW, NEVADA

DEVICE FOR REMOVING EGGS FROM FISH HATCHERIES

Application filed April 16, 1928. Serial No. 270,472.

This invention is concerned with fish hatcheries, and is more particularly concerned with means for separating and removing the dead from the live eggs from the hatchery troughs or jars.

In the artificial propagation of fish from eggs made necessary by the depletion of the fish supply, the eggs are placed in hatching troughs through which water is circulated. Dead eggs, which are readily distinguished from the good eggs by their color, collect at the top of the mass of eggs due to their lighter weight and must be removed to prevent the fungus which will develop thereon from contacting with and destroying the healthy live eggs during the period of incubation.

The removal of these dead eggs without removal also of good eggs, is a tedious task. As at present practiced, a rubber bulb having a glass tube in its end is used, the tube being inserted in the trough and the bulb compressed to cause suction of water and the desired eggs through the tube into the bulb from which they are subsequently ejected. If a live egg is seen passing up through the glass tube with the dead eggs, the entire contents of the bulb and tube must be returned to the trough in order to save the good eggs and the removal started afresh.

It is the object of the present invention to provide an evacuating device for dead eggs having means for ejecting a good egg as it is drawn therein without necessitating the ejection therefrom of the dead eggs previously evacuated.

It is a further object of the invention to provide a device in which the evacuation of the dead eggs from a trough may be practically continuous and automatic, intermittently interrupted only when necessary for the return of a live egg seen to enter the evacuating line, and then continued. The advantage of substantial continuity of operation, of course, is in conservation of time. Where, as in most hatcheries, the number of eggs under process of incubation is so huge, evacuation of the dead eggs is not only a continuous task, but, because of the large number of troughs necessarily involved, consumes a large amount of time.

The invention consists in the constructions, combinations, and arrangements hereinafter described and claimed, and is described as to a preferred structural embodiment in the following detailed specification which is to be read in conjunction with the accompanying illustrative drawing forming part thereof and in which:—

Figure 1 is a view in side elevation of my dead egg evacuating device.

Figure 2 is a longitudinal vertical sectional view thereof.

Figure 3 is a partial horizontal section through the egg collecting cup, being taken on line 3—3 of Figure 2, looking in the direction of the arrows.

Referring to the drawings, it will be seen at the outset that the evacuating device is in effect a siphon including an intermediate egg collecting cup, an entering glass tube, a final discharge tube, and a flow starting and stopping element in the form of a bulb.

The main body 1 of the device may be and preferably is of molded hard rubber of elongated form provided with an intake passage 2 at one end having a projecting nipple 3 which receives the end of the glass intake tube 4. The base of the body 1 is formed as a lateral annular enlargement 5 having a central annular recess 6 therein providing an annular outer flange 7 internally threaded to receive the externally threaded upper end of an egg collecting cup 8, which may be of hard rubber, as shown, or of another suitable substance, such as glass, metal, etc.

The inlet passage 2 curves downwardly to enter the annular recess 6 to discharge matter drawn in through tube 4 into the cup 8. The body 1 beyond the annular recess is continued as an elongated formation or neck 9 and is suitably joined to a soft rubber evacuating bulb 10 from the inner end of which an evacuating passage 11 extends through the neck 9 and is downturned to communicate with the annular recess 6 at a point adjacent to passage 2. This passage is continued below the base of the recess 6 in the form of a filtering tube 12 which may be formed integral with or may be suitably attached to the body 1. The open lower end of this tube 12 is covered by a suitable filtering screen 13 such as wire cloth having interstices of sufficiently small area to prevent the passage of the fish eggs therethrough while permitting a ready passage of water. The bulb 10 at its outer end is provided with a nipple 14 into which is inserted one end of a relatively long tube 15 of rubber having a suitable valve or cock 16 inserted therein adjacent to its outer end.

The described evacuating device, when used, is first "primed" by filling the cup 8, bulb 10 and communicating passages with water. The tube 4 is then inserted in the hatching trough to be cleared of dead eggs with the discharge tube 15 depending from the trough and inserted, if desired, in a suitable waste receiving receptacle. The valve 16 at the end of the tube is then opened to start the siphoning flow of water from the trough through the intake glass tube 4. The operator, holding the bulb 10 without pressure moves the glass tube 4 up and down the trough to approach the dead eggs which have worked to the top of the egg mass and are clearly distinguishable by their appearance. The evacuation will be continuous due to the siphoning action so long as the tube 4 is held in the water of the trough. The operator watches the glass tube continuously during the operation and when a good egg is seen to pass therein, he immediately compresses bulb 10 forcing the water and eggs, including the good egg in the tube only, out again (leaving the contents of the cup 8 intact) and then releases the bulb and continues the evacuating process, the siphoning action automatically resuming so that the evacuation is substantially continuous subject to intermittent operation, only when necessary, through the entry of good eggs in the tube 4. The invention may, therefore, be said to involve, independently of the structure of the evacuating device, a method of separation of a species of fish eggs or similar materials having visually differentiating characteristics, which method may be regarded as consisting in the continuous suction through a transparent intake passage for transportation to a collecting depository of eggs having a common visually observable characteristic; the momentary stoppage of intake flow and momentary ejection of the contents of the transparent intake passage upon the visualized entrance therein of an egg or eggs having a visually different and undesired characteristic; and the resumption thereafter of continuous suction of eggs through said transparent intake passage until other eggs of visually different and undesired characteristic are observed to pass therein.

The form of the invention described and disclosed herein represents a preferable embodiment of the invention, but is intended as illustrative rather than restrictive thereof. Structural changes and adaptations are, therefore, contemplated in consonance with the spirit of the invention and the scope of the appended claims.

I claim:

1. In a device of the character described, a head having a socket formed in its under face to receive a trapping cup and having separated liquid intake and discharge passages therein extending longitudinally in substantial alinement from opposite ends of said head and each down turned and separately communicating at its inner end with said socket, a cup detachably affixed at its upper end in said socket, a strainer tube within the cup depending from the socket end of and communicating with said discharge passage, a flow stopping bulb at the outer end of said discharge passage, a siphoning tube communicating with said bulb, and an intake tube extending from the outer end of said intake passage for immersion in liquid to be siphoned and strained.

2. In a device of the character described, an elongated head formed with an annular socket in its under face intermediate of its ends and with intake and discharge passages thereabove extending longitudinally in substantial alinement from opposite ends of said head and downturned in spaced relation at their inner ends to communicate with said socket area, a tube depending from the inner end of the discharge passage having an open screened lower end, a cup detachably affixed at its upper end in said socket to enclose said tube and inner passage terminals therewithin, an intake tube extending from the outer end of the intake passage for immersion in liquid, a flow stopping bulb connected at one end to the outer end of the discharge passage and forming a continuation thereof, and a valved siphoning tube connected to and extending from the other end of said bulb.

3. A device for the separation of materials having visually different characteristics comprising a transparent sighting intake tube, an outlet tube forming a siphon therewith and providing for continuous suction through said intake tube, a material trapping reservoir interposed between and communicating with each of said tubes, a material trapping strainer interposed between said outlet tube and reservoir, and means associated with the siphoning tube for ejecting from the transparent intake tube through the inlet opening thereof undesired material visually observed to enter said tube.

4. A device for the separation of materials having visually different characteristics comprising a transparent sighting intake tube, an outlet tube forming a siphon therewith to produce a continuous flow through the intake tube, a material trapping reservoir interposed between and communicating with each of said tubes, a strainer interposed between said outlet tube and reservoir, and means interposed in the outlet tube operable to stop the inflow and eject the contents of the intake tube upon the visually observed entrance therein of material having a visually undesirable characteristic.

5. A device for the separation in hatcheries of fish eggs having visually different characteristics comprising a transparent sighting intake tube, an outlet tube forming a siphon therewith to produce a continuous flow through said intake tube, an egg trapping reservoir interposed between and communicating with each of said tubes, an egg trapping strainer interposed between said outlet tube and reservoir, and a tube priming siphon starting bulb interposed in said outlet tube and operable momentarily to stop flow through the intake tube and eject the contents of the intake tube upon the observed entrance into said intake tube of fish eggs having a visually observed undesirable characteristic.

6. The method of separating in fish hatcheries, eggs having visually different characteristics which consists in continuously drawing through a transparent sighting intake tube for transportation to a collecting depository, eggs having a common visually observable characteristic, and momentarily stopping the passage of eggs through said tube and ejecting the contents of said tube through the inlet opening thereof upon the visual entrance therein of eggs having a visually different and undesired characteristic, and thereafter resuming passage of eggs through said intake tube until such time as eggs having a visually different and undesired characteristic are again observed to enter therein.

Signed at Carson City, in the county of Ormsby and State of Nevada, this 11th day of April, A. D. 1928.

JOSEPH BERGER.